Figure 1:
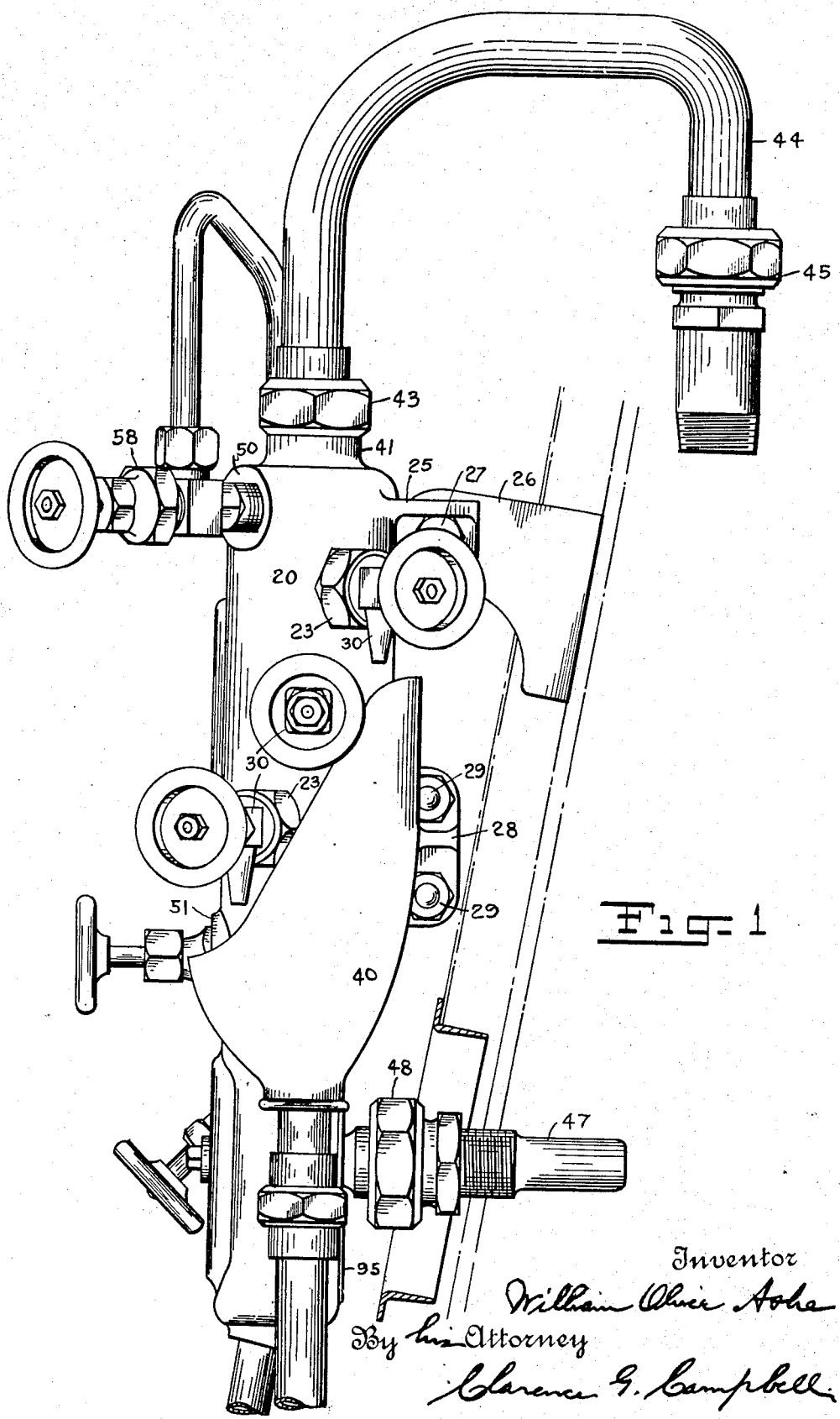

Oct. 30, 1928.

W. O. ASHE 1,689,191

WATER COLUMN

Filed June 16, 1921 5 Sheets-Sheet 1

Inventor
William Oliver Ashe
By his Attorney
Clarence G. Campbell

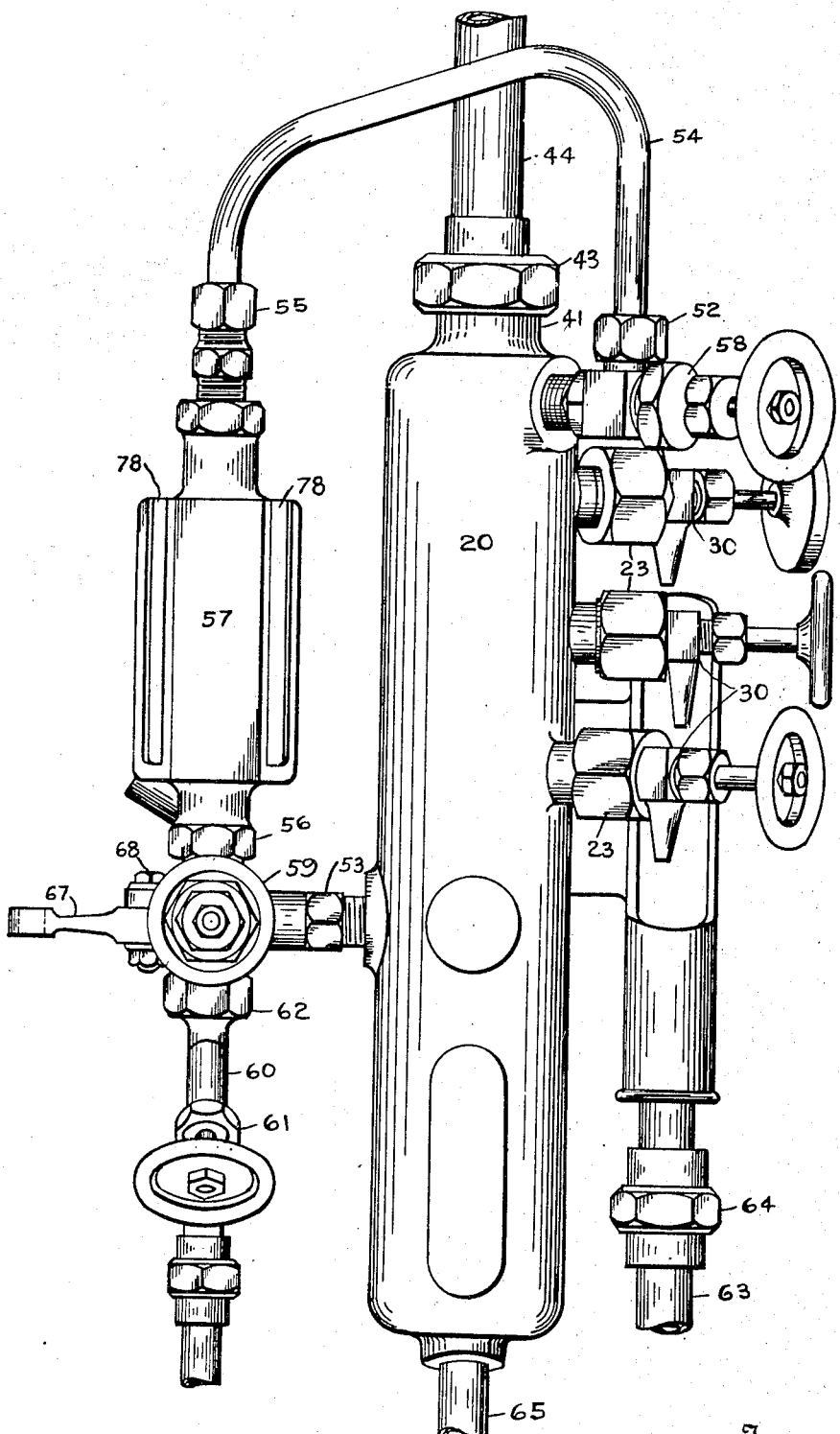

Oct. 30, 1928.  
W. O. ASHE  
WATER COLUMN  
Filed June 16, 1921  
1,689,191  
5 Sheets-Sheet 3
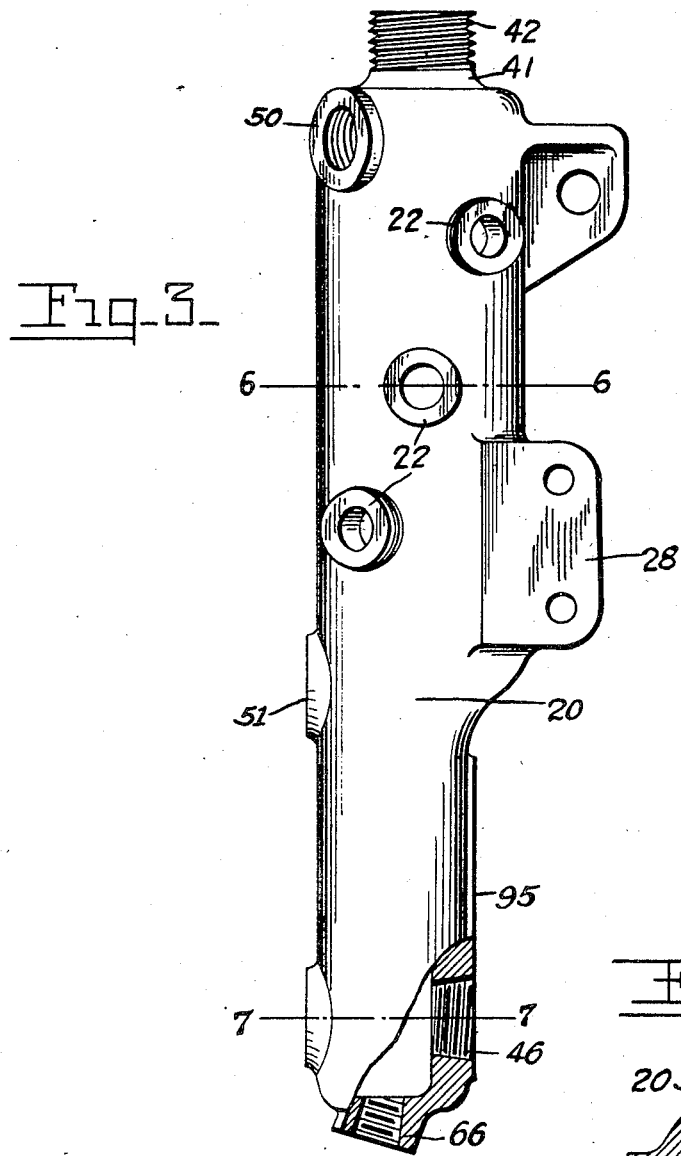
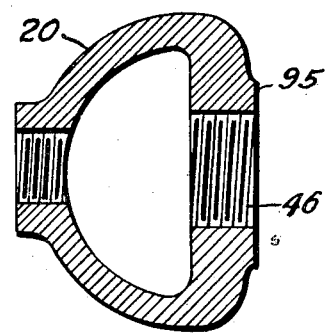
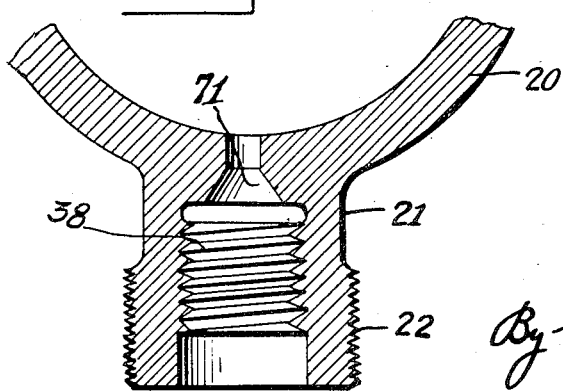
Inventor.  
William Oliver Ashe  
By his Attorney  
Clarence G. Campbell

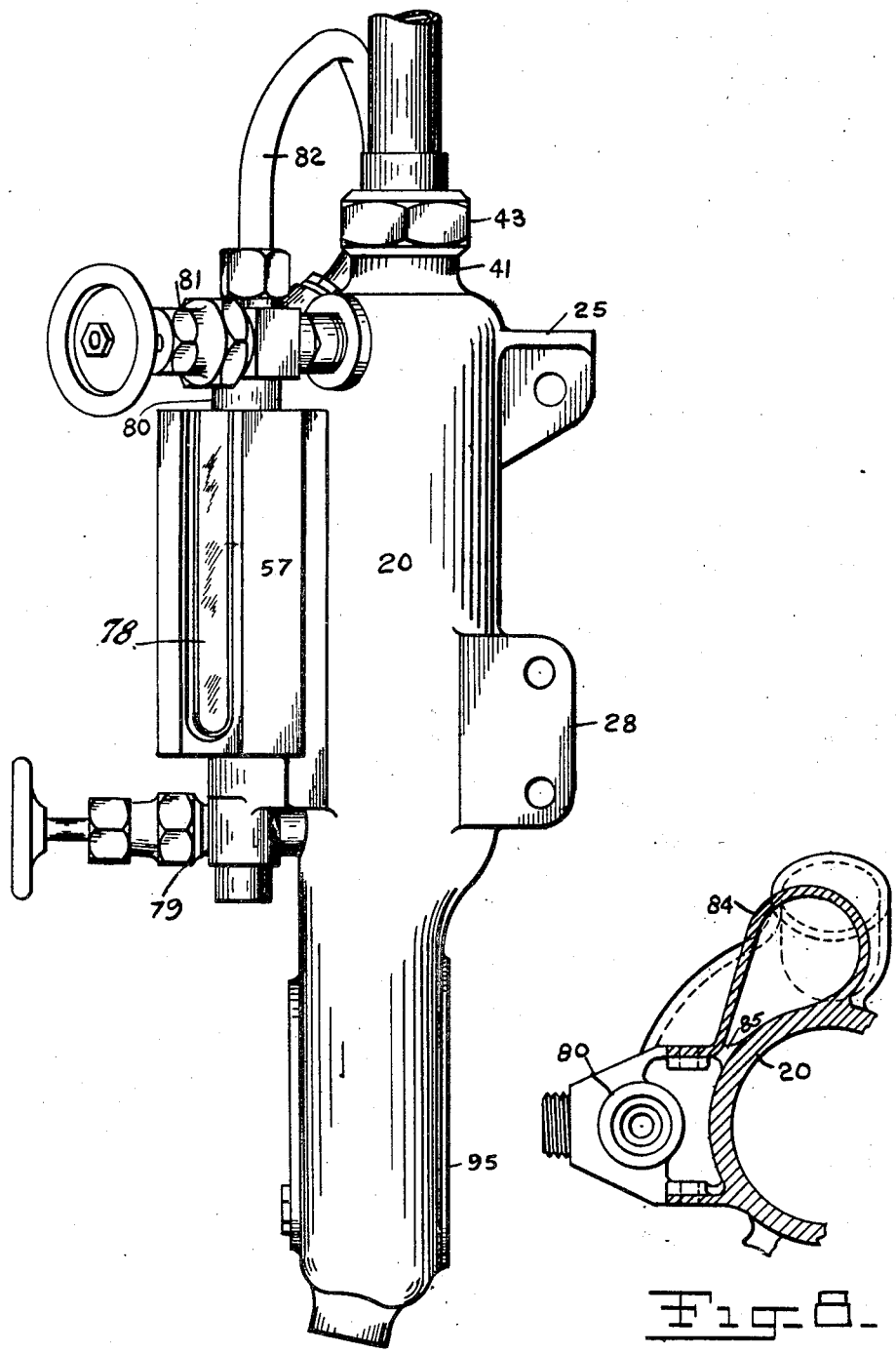

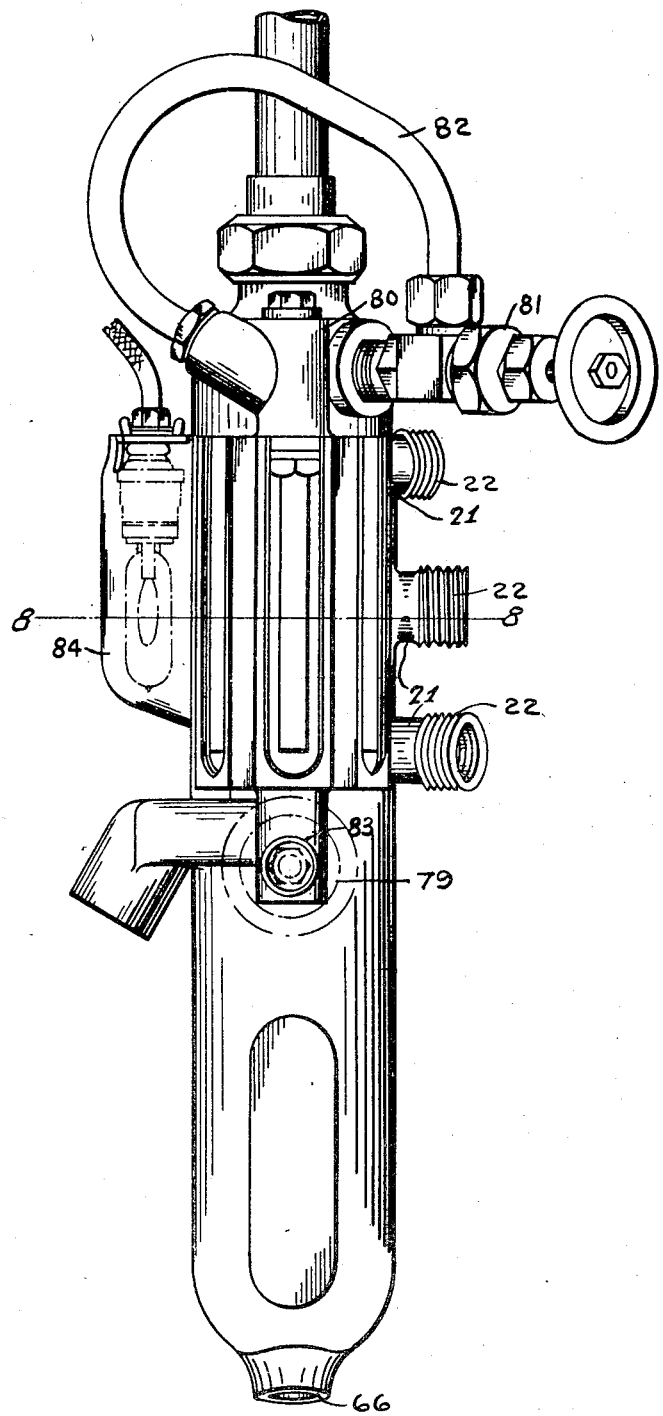

Patented Oct. 30, 1928.

UNITED STATES PATENT OFFICE.

WILLIAM O. ASHE, OF NEW YORK, N. Y., ASSIGNOR TO NATHAN MANUFACTURING COMPANY, OF NEW YORK, N. Y., A CORPORATION OF NEW YORK.

WATER COLUMN.

Application filed June 16, 1921. Serial No. 477,872.

My invention relates to water columns, and more particularly to the adaptation and arrangement of parts in connection therewith, as will be more fully hereinafter pointed out.

Serious problems have arisen in engine practice in relation to determining the correct indication of the height of water in the boiler over the crown sheet, which is the top of the fire box. Neither the water gage nor the gage cock of ordinary locomotive practice correctly indicates the desired height of water over the crown sheet. The height of water as indicated by both the water gage and gage cock is more particularly at fault during the period when the locomotive is in operation with the throttle valve of the engine open.

It has been determined by exhaustive investigation of this subject by the Federal boiler inspection service that in a locomotive boiler which usually has a sloping back head there is a very severe circulation in the back head of the boiler when the locomotive is in operation with the throttle valve of the engine open. This investigation disclosed that often while the locomotive is in operation with the throttle valve of the engine open the water gage and also all three gage cocks indicate that the water in the boiler is above the height required, whereas on stopping the locomotive it has been determined that with the locomotive at rest the actual height of water in the boiler was far below the amount required for the safety of both the boiler and of the crown sheet.

This false indication in both the water gage and gage cock of usual locomotive practice often leads not only to the damage of the crown sheet, but has in many instances been a contributing factor in boiler explosions.

My invention overcomes these difficulties and unnecessary hazards of the present locomotive and engine practice, and enables the operator or engineer to at all times and under all conditions know the correct height of the water in the boiler over the crown sheet.

The fact has definitely been determined that gage cocks screwed directly to the boiler do not correctly indicate the general water level, and that in order to make them give a correct indication of the water level it is necessary to apply an intermediate device between the boiler and the gage cock, which is the water column. This consists practically of a long cylinder of proper diameter with top and bottom connections to the steam space and water space of the boiler, and is provided with proper means for attaching to said column gage cocks and a water gage.

There is very little available space on the back head of a locomotive, as there are so many necessary appliances located there in order that they may be within easy reach and sight of the engineer at all times. The available space for application of the water column is also greatly restricted by the main throttle lever. The application of two water glasses, one of which is applied to the water column on the right hand side of the back head, further restricts the back head space. It has therefore been necessary, in order to make my device practical in locomotive practice, to so construct the water column that it will lie close to the boiler head its entire length, and particularly at its lower extremity where the available space is most limited, and I have so devised it with the lower portion having a substantially reduced cross section. It is also necessary in locomotive practice that the handles of the valves of the gage cocks and of the water gage should lie as close as possible to the valves, as otherwise they will interfere with the other appliances. I have solved both of these problems by the valve disclosed herein.

Means for lighting the water gage is most essential as the level of the water in the boiler must be observed at night as readily as during the day, but heretofore the means for so lighting the water gage has taken much valuable space, and therefore has been most objectionable to the engineer. My device overcomes this difficulty by placing the lighting means in a sub-casing adjacent to the water gage, which not only saves space, but also protects the lighting means, and does not obstruct the light rays in the daytime as does the electric lighting fixture as usually mounted.

In the attached drawings Figure 1 is a side view of one embodiment of my device showing the sloping back head of the usual locomotive boiler in dotted outline; Figure 2 is a front elevation of the device shown in Figure 1 as seen facing the back head of the locomotive boiler; but with the upper connecting pipe to the boiler broken away; Figure 3 is a side elevation of the main body of the water column as illustrated in Figure 1 but broken away at its lower end to show in detail certain connections; Figure 4 is a side view of another embodiment of my device in which the water gage is attached directly to the water column, and in which provision is made for lighting the water gage; Figure 5 is a front elevation of the structure set forth in Figure 4; Figure 6 is a fragmentary cross-section on line 6—6 Figure 3 showing the gauge cock connection and the valve seat; Figure 7 is a cross section on line 7—7 Figure 3 and Figure 8 is a fragmentary cross section on line 8—8 Figure 5.

In the drawings 20 is the main body of the water column to which are cast integrally three necks 21, having external left hand threads 22, and on which are adapted to be mounted three gage cocks 30 by means of coupling nuts 23 which are internally threaded with a left hand thread adapted to engage the left hand thread 22.

The body 20 also has integrally cast thereto a bracket 25 which is adapted to be bolted by means of a bolt 27 to bracket 26, which is rigidly secured to the boiler head. Another bracket 28 is also integrally cast to the body 20, to which by means of bolts 29 is adapted to be rigidly secured a dripper 40, which is adapted to catch water and steam from the gage cocks 30. At the upper end of the body 20 is a neck 41 having an external thread 42, to which connection is made by a union coupling 43 having an internal thread, to a pipe 44, which at its opposite end is connected to the top of the boiler head or steam head at 45 by a union coupling. Connection is also made to the lower or water containing part of the boiler head at the bottom of the body 20 by means of a threaded boring 46 into which a pipe 47 having union coupling 48 is adapted to be threaded, connecting the body of the water column thereto.

The body 20 also has integrally cast therein necks 50 and 51, both of which are internally threaded, and into neck 50 of which by means of union coupling 52 is secured a pipe connection 54. The pipe 54 is connected by means of union coupling 55 to a water gage 57. Valves 58 and 59 are secured to the water column 20, valve 59 being between the lower end of the gage and the neck 51, and the two valves are thus adapted to control the circulation of water and steam to the gage, thereby enabling the operator to shut off the water and steam when desired, so that in case of breakage of the glass tube inside of the gage 57 it can be readily and quickly replaced without difficulty or injury from the escaping water or steam.

The main body is so constructed as to permit its close association with the back head of the boiler. This is very essential in view of the numerous appliances that are located on the back head and also range of movement of the main throttle lever. The upper portion of the body 20 is of relatively large cross section while the lower portion is of reduced cross section. This lower portion is preferably flattened along the rear side as shown at 95. This construction therefore permits the water column to be fitted close to the boiler head in a vertical position with the lower portion almost in contact with the sheet of the boiler.

An exhaust pipe 60 in which there is a control valve 61 is connected to the bottom of the gage 57 by means of a union coupling 62. An exhaust pipe 63 is also connected to the dripper 40 by means of a union coupling 64. An exhaust pipe 65 having an external threading is screwed into an internally threaded neck 66 cast integral with the body 20 at the base. A holder 67 is rigidly mounted at 68 so as to mount a lantern thereon for lighting the gage 57.

The gage cocks 30 have bodies which are adapted to be secured directly to the necks 21 by means of coupling nuts 23 which engage the external threading 22 of necks 21. An emergency valve, not shown, of gage cocks 30 is adapted to seat in emergency valve seat 71.

It should be noted that by placing the emergency valve seat 71 in the body of the column 20, as shown in Fig. 6, and that by arranging the gage cock body so that it is secured directly to the neck 21 of the column 20, a very material saving in the extension of the gage cock from the body of the column 20 has been effected. This effects a very material saving in the very restricted space available in the cab of the locomotive.

The water gage 57 has sight glasses 78, and the usual tubular gage glass is mounted inside of 57 in the usual manner.

In the operation of the water column as described, the water will circulate freely from the boiler through pipe 47, thence through the body 20 until it finds its level. The valve 59 will under usual conditions be wide open so that the water will pass from the water column body 20 through the union coupling 53, valve 59, into the water gage 57 until it finds its level. Steam will enter the water column body 20 through the pipe 44 and connections from the steam head of the boiler, and will also flow through pipe 54 and valve 52 into the water gage 57. This steam will cause a downward pressure on the water in both the body 20 and the water gage 57, and thereby correct the water level in the gage 57 and cocks 30. Valves 58 and 59 can whenever desired be closed so that even while the engine is running the tubular gage glass in gage 57 can be replaced if it is broken, as often occurs in engineering practice. The lower gage cock 30 is on the same level as the lowest part of the gage glass on the interior of the gage 57, both of which indicate the lowest safety point for water in the boiler. The other two gage cocks will on opening indicate whether the water is at those levels or below. It is thus seen that the water in coming from the boiler is received directly into the water column body 20 before it passes into the water gage 57, and has an opportunity to become stabilized as to its level in the body 20, thereby correcting said water level before it is indicated in the water gage 57 or the gage cocks 30.

Another embodiment of my device is shown in Figures 4, 5 and 8, in which the water gage 57 is mounted between lower neck 79, which is cast integrally to the body 20, and upper neck 80, which is also cast integrally to the body 20, which mounts are made by means of the usual external and internal threadings. Valve 81 is mounted in the upper end of the body 20 so as to control the flow of steam from the body 20 through a pipe 82 into the water gage 57. Valve 83 is mounted in the lower neck 79 so as to control the flow of water from the body 20 into the gage 57. A sub-casing 84 is integrally cast to the body 20, having a longitudinal opening 85 the length of sub-casing 84, which opens into the gage 57. An electric light of usual construction is adapted to be rigidly mounted in the usual manner in said sub-casing 84, and the light from the same will shine through the opening 85, thereby illuminating the interior of the water gage 57.

The operation of this second embodiment of my water column is substantially the same as the operation of the first embodiment as above described.

I claim:

1. In combination a sloping boiler head, a water column attached thereto and having a body adapted to lie its entire length close to said sloping boiler head, gage cocks secured to said body, a water gage mounted adjacent said body, a controllable valved communication between the water column and the water gage, waste pipes communicating with said body, gage cocks and water gage respectively, a sub-casing adjacent said body and means for lighting said water gage mounted in said sub-casing.

2. In combination a sloping boiler head, a water column attached thereto and having a body adapted to lie its entire length close to said sloping boiler head, gage cocks secured to said body, a water gage mounted adjacent said body, communicating conduits between the water column and the water gage, waste pipes communicating with said body, gage cocks and water gage respectively, together with means for controlling the flow of steam and water into the column of said gage, a sub-casing on said body and means for lighting said water gage mounted in said sub-casing.

3. In combination a sloping boiler head, a water column attached thereto having a body adapted to lie its entire length close to said sloping boiler head, gage cocks secured to said body, a water gage mounted adjacent thereto, a valved communication between the water column and the water gage, waste pipes communicating with said body, gage cocks and water gage respectively, and a bracket extending from said water gage for supporting means for lighting said water gage.

In testimony whereof I affix my signature.

WILLIAM O. ASHE.